(12) United States Patent
Kumar et al.

(10) Patent No.: US 12,043,120 B2
(45) Date of Patent: Jul. 23, 2024

(54) SYSTEMS AND METHODS FOR ACTIVE DAMPING OF A PLATFORM OF A VEHICLE

(71) Applicant: Transportation IP Holdings, LLC, Norwalk, CT (US)

(72) Inventors: Ajith Kuttannair Kumar, Erie, PA (US); Subhas Chandra Das, Bengaluru (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 502 days.

(21) Appl. No.: 17/446,758

(22) Filed: Sep. 2, 2021

(65) Prior Publication Data
US 2022/0080836 A1 Mar. 17, 2022

Related U.S. Application Data

(60) Provisional application No. 63/077,944, filed on Sep. 14, 2020.

(51) Int. Cl.
*B60L 15/20* (2006.01)
*B61F 5/24* (2006.01)

(52) U.S. Cl.
CPC ............ *B60L 15/20* (2013.01); *B61F 5/245* (2013.01); *B60L 2200/26* (2013.01); *B60L 2240/421* (2013.01); *B60L 2240/423* (2013.01)

(58) Field of Classification Search
CPC ............ B60L 15/20; B60L 2240/421; B60L 2240/423; B61F 5/245; G06F 19/00

(Continued)

(56) References Cited

U.S. PATENT DOCUMENTS 8,862,300 B2 * 10/2014 Ichinose ............... B60W 10/18
 701/22
8,892,280 B2 * 11/2014 Kinoshita ............. B60W 10/06
 701/1

(Continued)

FOREIGN PATENT DOCUMENTS

EP 2552722 A1 2/2013
EP 3360725 A1 8/2018

(Continued)

OTHER PUBLICATIONS

1st Office Action mailed Jun. 30, 2023 received for corresponding Chinese Patent Application No. 2021110754607 (13 pages).

(Continued)

*Primary Examiner* — Erick R Solis
(74) *Attorney, Agent, or Firm* — K&L Gates LLP

(57) ABSTRACT

A method includes detecting an out of phase condition and an in-phase condition between a vehicle platform and two or more propulsion units attached to the platform. A first speed from a first propulsion unit is compared to a second speed and a torque of one or more propulsion units is controlled to reduce the out of phase condition and/or the in-phase condition when a difference between the first speed and the second speed is greater than a threshold value. A vehicle includes a platform, two or more propulsion units attached to the platform, and a processor. The processor compares a first speed from a first propulsion unit to a second speed, detects from the comparison an out of phase condition between the platform and the two or more propulsion units, and detects from the comparison an in-phase condition between the platform and the two or more propulsion units.

20 Claims, 8 Drawing Sheets

(58) Field of Classification Search
USPC .................. 701/19, 37, 38, 99, 101–115
See application file for complete search history.

(56) References Cited

U.S. PATENT DOCUMENTS

| | | | | |
|---|---|---|---|---|
| 9,211,873 | B2* | 12/2015 | Kikuchi | ................. B60G 17/06 |
| 10,486,547 | B2* | 11/2019 | Suzuki | ............... B60L 15/2009 |
| 2007/0095585 | A1* | 5/2007 | Imura | .................... B60T 8/175 |
| | | | | 180/65.31 |
| 2011/0077835 | A1* | 3/2011 | Otsuka | ................. B60W 10/10 |
| | | | | 701/99 |
| 2012/0022755 | A1* | 1/2012 | Oda | ...................... B60W 10/11 |
| | | | | 701/58 |
| 2012/0059544 | A1* | 3/2012 | Kinoshita | ............ B60W 10/06 |
| | | | | 903/902 |
| 2012/0245773 | A1* | 9/2012 | Suzuki | .................... B60L 15/20 |
| | | | | 701/22 |
| 2012/0253616 | A1 | 10/2012 | Halleberg et al. | |
| 2013/0200835 | A1* | 8/2013 | Sekiguchi | ........... G05B 19/404 |
| | | | | 318/490 |
| 2014/0107877 | A1* | 4/2014 | Bang | ................. B60L 15/2045 |
| | | | | 701/22 |
| 2014/0318411 | A1* | 10/2014 | Ogawa | ................... B61F 5/245 |
| | | | | 105/199.2 |
| 2015/0012160 | A1* | 1/2015 | Tsutsumi | ............... B60L 15/20 |
| | | | | 701/22 |
| 2015/0191089 | A1* | 7/2015 | Yamamoto | ........... B60W 20/14 |
| | | | | 701/22 |
| 2019/0168785 | A1* | 6/2019 | Ogawa | .................... F16F 9/461 |
| 2019/0232940 | A1 | 8/2019 | Ashrafi et al. | |
| 2021/0300445 | A1* | 9/2021 | Ellis | ....................... B60L 13/06 |

FOREIGN PATENT DOCUMENTS

| | | |
|---|---|---|
| GB | 201718334 | 12/2017 |
| GB | 2568097 A | 5/2019 |
| JP | 11200928 A | 7/1999 |
| JP | 2001045613 A | 2/2001 |
| WO | 2011075067 A1 | 6/2011 |
| WO | 2019152449 A1 | 8/2019 |

OTHER PUBLICATIONS

European Search Report received for related European Patent Application No. 21 19 6265 dated Apr. 21, 2022 (9 pages).

Office Action mailed Dec. 14, 2023 for corresponding Japanese Patent Application No. 2021-148903 (9 pages).

* cited by examiner

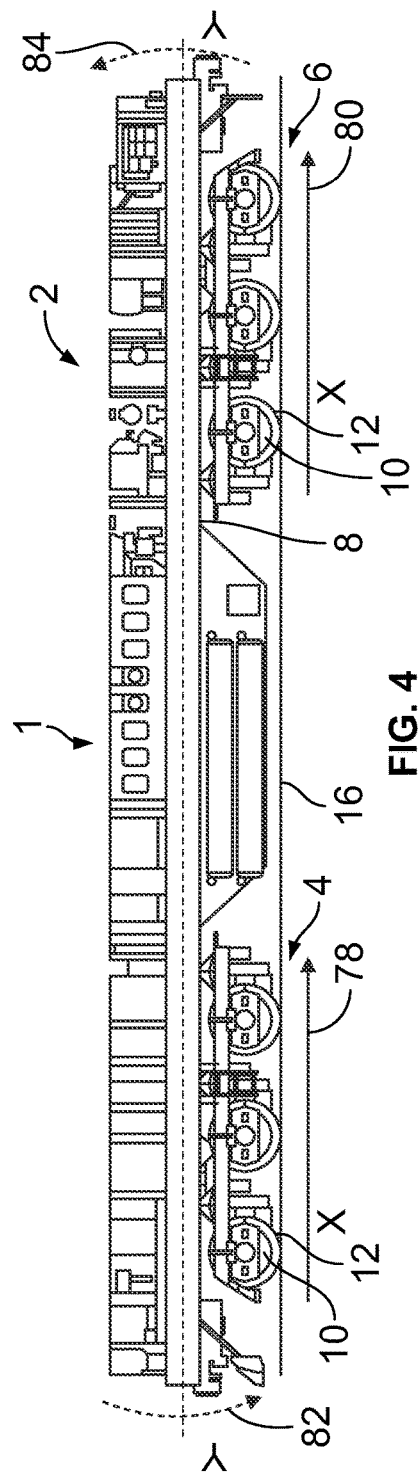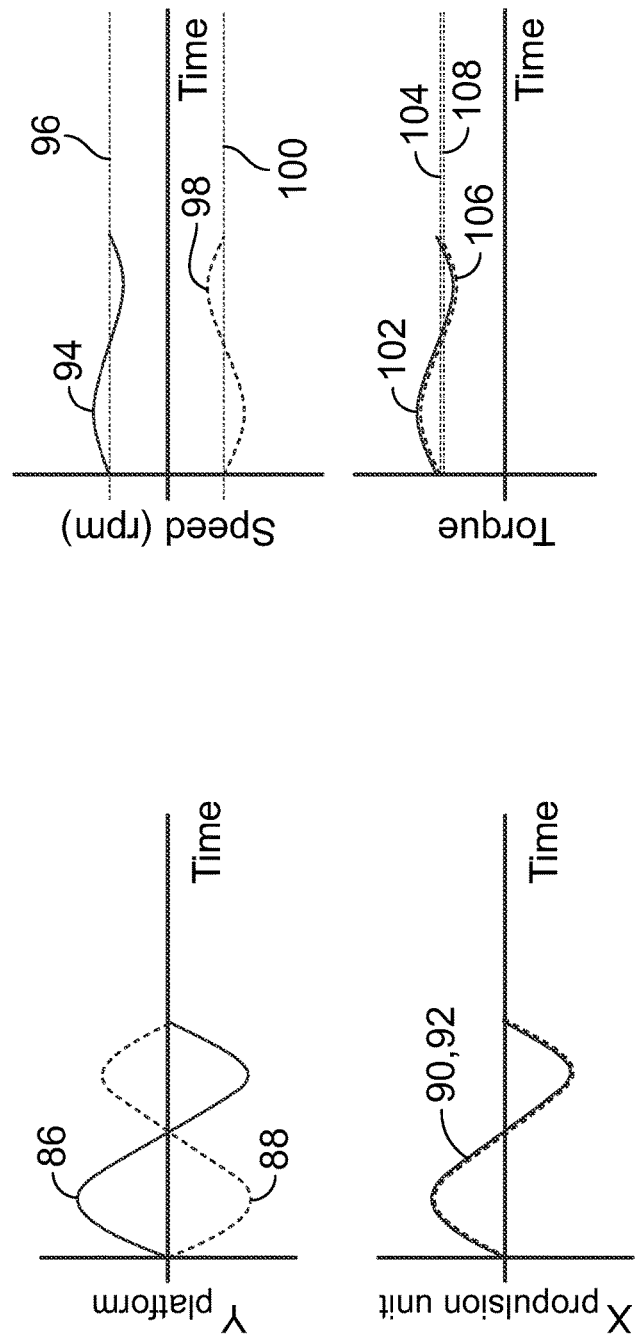

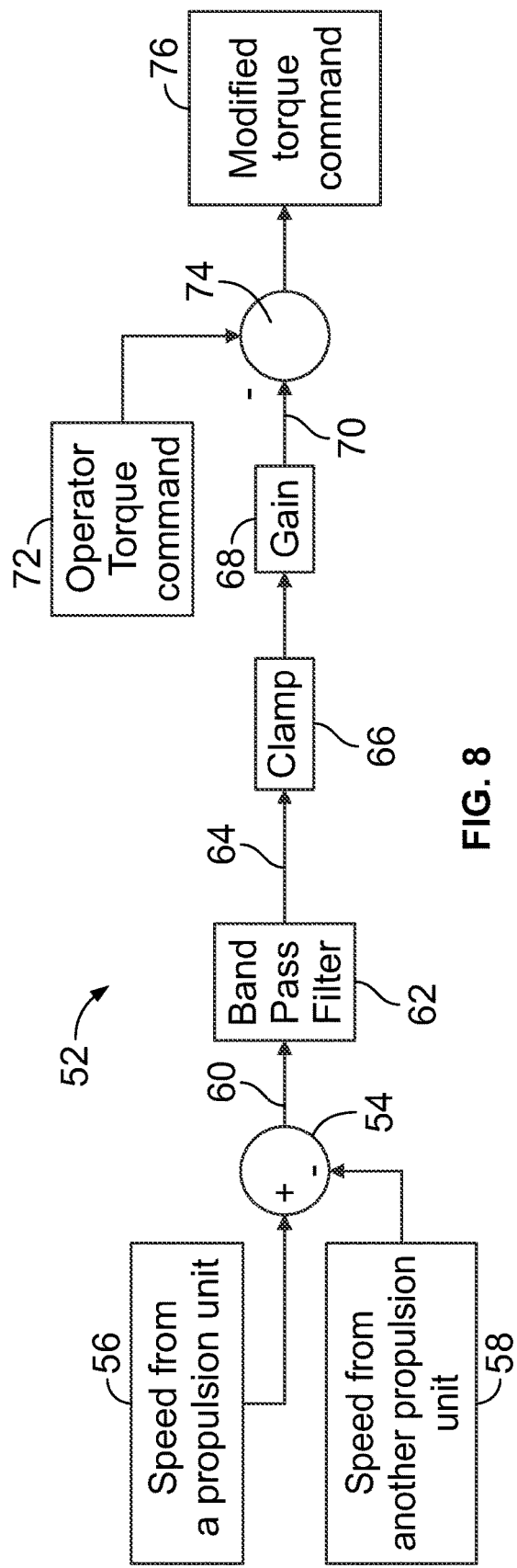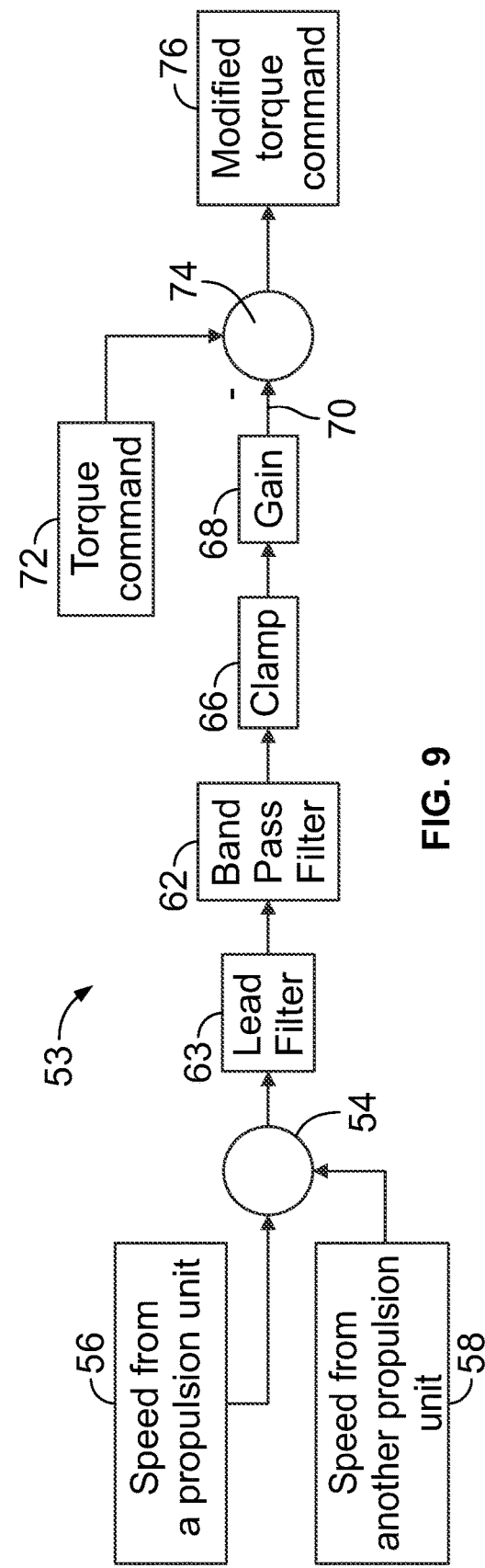
FIG. 8
FIG. 9

SYSTEMS AND METHODS FOR ACTIVE DAMPING OF A PLATFORM OF A VEHICLE

CROSS REFERENCE TO RELATED APPLICATION

This application claims priority to U.S. Provisional Application 63/077,944, filed 14 Sep. 2020, the entire contents of which are incorporated herein by reference.

BACKGROUND

Technical Field

The disclosed subject matter described herein relates to systems and methods for active damping of motions of a vehicle.

Discussion of Art

A vehicle that includes one or more propulsion systems may experience transient modes when the vehicle is below a certain weight, and/or while spring constants and/or damping of the suspension system of the vehicle is insufficient or inadequate. The transient modes can cause longitudinal, lateral, vertical, and/or angular movements that may damage vehicle components, especially when the transient modes include sustained resonant modes.

The transient modes of a vehicle platform (e.g., a vehicle platform or chassis) may lead to lateral, vertical, and/or longitudinal movement of vehicle components, which may lead to oscillatory movement of axles of the vehicle (e.g., oscillation in angular velocity about a mean speed). Each axle movement may cause oscillation in speed sensor feedback. This can cause a control system of the vehicle to take corrective action(s). These action(s), in-turn, may cause motor torque fluctuations. The motor torque fluctuations may act as an exciting force at a close frequency range of a platform resonance frequency, which can amplify axle movements.

Thus, a need exists for systems and methods to reduce, or eliminate, transient modes between a platform of a vehicle system and one or more propulsion units connected to the platform.

BRIEF DESCRIPTION

In accordance with one embodiment, a method includes detecting an out of phase condition between a vehicle platform of a vehicle and propulsion units attached to the vehicle platform and detecting an in-phase condition between the vehicle platform and the propulsion units attached to the vehicle platform. The method further includes comparing a first speed from a first propulsion unit of the propulsion units to a second speed and reducing one or more of the out of phase condition or the in-phase condition by controlling a torque of one or more of the propulsion units responsive to a difference between the first speed and the second speed being greater than a threshold value.

In accordance with one embodiment, a method includes detecting a phase change from a nominal phase between a vehicle platform of a vehicle and two or more propulsion units attached to the vehicle platform and comparing one or more of a first axle speed from a first axle of a first propulsion unit and a second axle speed from a second axle of a second propulsion unit or a first torque of a first motor of the first propulsion unit and a second torque of a second motor of the second propulsion unit. The method further includes determining that one or more dampers connected between the vehicle platform and the two or more propulsion units is degraded when one or more of a first difference between the first axle speed and the second axle speed is greater than a first threshold difference or a second difference between the first torque and the second torque is greater than a second threshold difference.

In accordance with one embodiment, a vehicle system includes a platform and two or more propulsion units attached to the platform. The vehicle system further includes a processor. The processor compares a first speed from a first propulsion unit of the two or more propulsion units to a second speed and detects from the comparison of the first speed and the second speed an out of phase condition between the platform and the two or more propulsion units attached to the vehicle platform. The processor further detects from the comparison of the first speed and the second speed an in-phase condition between the platform and the two or more propulsion units attached to the vehicle platform.

BRIEF DESCRIPTION OF THE DRAWINGS

The inventive subject matter may be understood from reading the following description of non-limiting embodiments, with reference to the attached drawings, wherein below:

FIG. 4 schematically depicts a vehicle system according to one embodiment in a second mode;

FIG. 5 schematically depicts movements of a platform and propulsion units of the vehicle system of FIG. 4 according to the second mode;

FIG. 6 schematically depicts corresponding traction motor speed and torque oscillations of traction motors of the propulsion units of the vehicle system of FIG. 4 according to the second mode;

FIG. 8 schematically depicts a system for actively damping transient modes of vehicle systems according to one embodiment;

FIG. 9 schematically depicts a system for actively damping transient modes of vehicle systems according to one embodiment;

DETAILED DESCRIPTION

Embodiments of the subject matter described herein relate to vehicle systems and systems and methods to reduce transient modes of vehicle platforms. These transient modes can be caused by, for example, lightweight platforms or improper spring constants, or low damping. The transient modes may lead to equipment damage or uncomfortable rides when the platform of a vehicle system is in a transient mode, for example at or near the resonant frequency of the platform, and the transient mode is sustained. The systems and methods may detect when a platform is in a transient mode, for example by comparing speeds of propulsion units of the vehicle system (in embodiments where the vehicle includes multiple propulsion units) and/or by comparing speeds of one or more of the propulsion units with the speed of the vehicle system. The systems and methods may reduce the transient modes of the platform by controlling torque applied to the propulsion unit(s) of the vehicle system to reduce an out of phase and/or an in-phase condition of the platform.

Embodiments of the subject matter described herein also relate to systems and methods for determining the health of mechanical dampers of the vehicle system between the platform and the propulsion units. The systems and methods may be used in vehicle systems that rely only on the mechanical dampers to reduce out of phase conditions of the platform, or in vehicle systems which use both mechanical dampers and active damping through control of torque to one or more of the propulsion units. The systems and methods may detect degraded mechanical dampers from speed differences that indicate an out of phase condition, or by exciting one or more dampers by injecting torque to the one or more dampers to determine if extracted values of magnitude and frequency of a speed feedback signal exceed predetermined values or thresholds.

Figure 1:
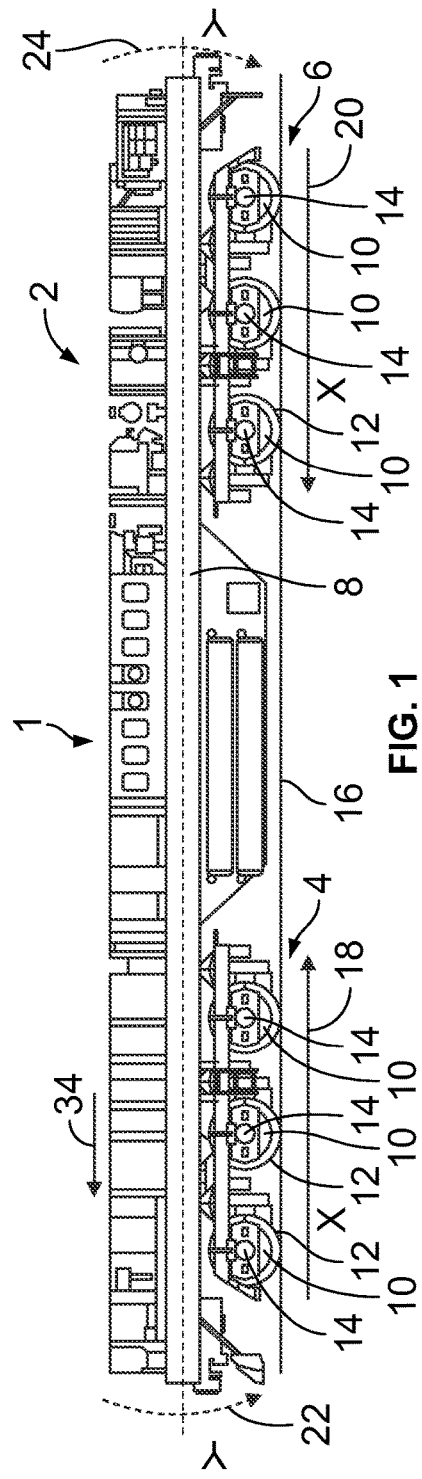
FIG. 1 schematically depicts a vehicle system according to one embodiment in a first mode.

Referring to FIG. 1, according to one embodiment a vehicle system 1 includes a single vehicle 2. The vehicle includes a front propulsion unit 4 and a rear propulsion unit 6. Alternatively, the vehicle may include a single propulsion unit or no propulsion units. A suitable single vehicle may be a single automobile, rail vehicle, off-highway vehicle, marine vessel, airplane, or the like. In other embodiments, the vehicle may be part of a vehicle system and may include two or more vehicles. Suitable multiple vehicle systems may include a rail vehicle consist, train, convoy of multiple automobiles or on-road trucks, drones and swarms of autonomous and semi-autonomous vehicles, and the like (collectively a vehicle system or vehicle group). In vehicle system including multiple vehicles, the vehicles in the vehicle system may be mechanically and/or communicatively coupled. Optionally, the vehicle system may have multiple vehicles that are not mechanically coupled with each other, but that communicate with each other or another system to coordinate movements of the vehicles for the vehicles to travel together as a vehicle system. Communicatively coupled vehicles may be part of a mesh or other network. A vehicle may communicate with other vehicles in the vehicle system, wayside equipment, communication systems (e.g., cell towers or satellites), and back-office systems. Vehicle to vehicle communication may be done directly, with or without a hopper or booster, or indirectly through a communication system.

According to one embodiment, the front propulsion unit and/or the rear propulsion unit may include one or more traction motors 10 that are operatively coupled to axles 14 to rotate the axles. The axles may connect wheels 12 on opposite sides of the vehicle. Although each of the front and the rear propulsion units are shown with each including three axles the vehicle may include more than two propulsion units which may each include a different number of axles, for example four axles per propulsion unit. Alternatively, the traction motor(s) may be coupled with the wheels and the vehicle may not include any axles that are rotated by the traction motor(s). The wheels propel the vehicle along a route. According to one embodiment, the route may be a track that includes one or more rails. According to other embodiments, the route may be a road surface or an off-road surface over which the vehicle system travels.

According to other embodiments, the vehicle system may include a single vehicle or a plurality of vehicles. The single vehicle or one or more of the plurality of vehicles may include one or more propulsion units connected to a platform of the vehicle. The one or more propulsion units may include one or more electric motors. The one or more propulsion units may include one or more engines, such as internal combustion engines. The one or more propulsion units may include a combination of one or more electric motors and one or more engines.

The front and rear propulsion units are attached to a platform 8 of the vehicle. The platform may be a chassis of the vehicle. The platform may be a structure that supports the propulsion unit(s) and other systems of the vehicle. With lightweight and/or low-damping platforms transient modes may cause vertical and/or angular movements of the propulsion unit(s) which may cause an uncomfortable ride and/or damage to the vehicle. The transient modes and the damage caused may be increased when the platform is close to or at the resonant frequency of the platform for a sustained period of time. The transient modes of the platform may also lead to lateral, vertical, and/or longitudinal movements of the propulsion unit(s) which leads to oscillatory movement of the axles, for example oscillation in angular velocity about a mean speed. Each axle movement can cause oscillation in speed sensor feedback which may cause a control system of the vehicle to take corrective action which in turn causes motor torque fluctuations. Motor torque applied to the axles in a frequency range close to the platform resonance frequency may amplify the axle movements.

Referring still to FIG. 1, the vehicle is propelled by the front and rear propulsion units and travels along the route. The vehicle may also be coupled to one or more other vehicles of the vehicle system. The propulsion units may each have a speed that is determined by the revolutions per minute (rpm) of the axles and/or the wheels of the propulsion units. However, as the vehicle speed may differ from the speed of the front and/or rear propulsion units due to, for example, slippage between the wheels and the route. The speed of the front and/or rear propulsion unit may also differ from the vehicle speed if the speed of one or more other vehicles of the vehicle system differs from the speed of the front and/or rear propulsion units. If a relative speed 18 of the front propulsion unit relative to the speed 34 of the vehicle system is opposite to a relative speed 20 of the rear propulsion unit relative to the speed of the vehicle system, a front moment 22 may be applied to the front of the vehicle and a rear moment 24 may be applied to the rear of the vehicle. The front moment and the rear moment act to create a first transient mode of the platform. This first transient mode can cause the platform to bow or otherwise change shape such that one or more of the propulsion units or other portions of the platform move vertically and/or longitudinally with respect to the route.

Figure 2:
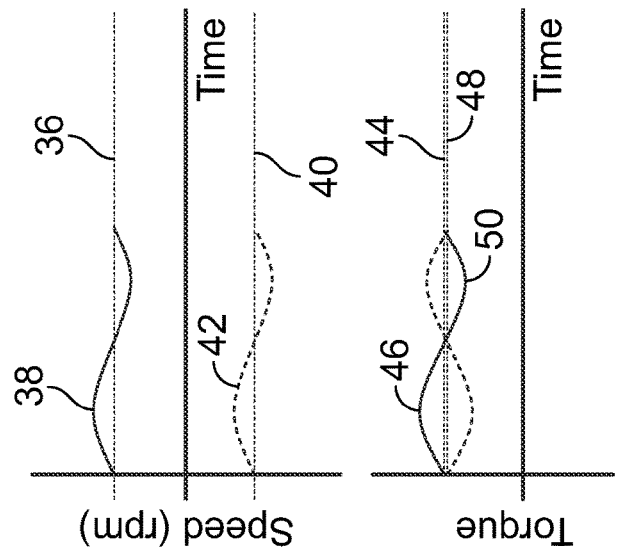
FIG. 2 schematically depicts movements of a platform and propulsion units of the vehicle system of FIG. 1 according to the first mode.

Referring to FIG. 2, the displacement Y of the platform in the first transient mode can include a displacement 26 of the rear of the platform and/or a displacement 28 of the front of the platform. According to one embodiment, in the first transient mode, the rear platform displacement and the front platform displacement may have the same frequency, the same magnitude, and/or the same period. As further shown in FIG. 2, the rear propulsion unit displacement 30 in the first transient mode generally opposes the front propulsion unit displacement 32 (which may be of the same or different magnitudes). According to one embodiment, the rear propulsion unit displacement and the front propulsion unit displacement may be in opposite directions (e.g., one is downward or toward the route of the vehicle system while the other is upward or away from the route).

Figure 3:
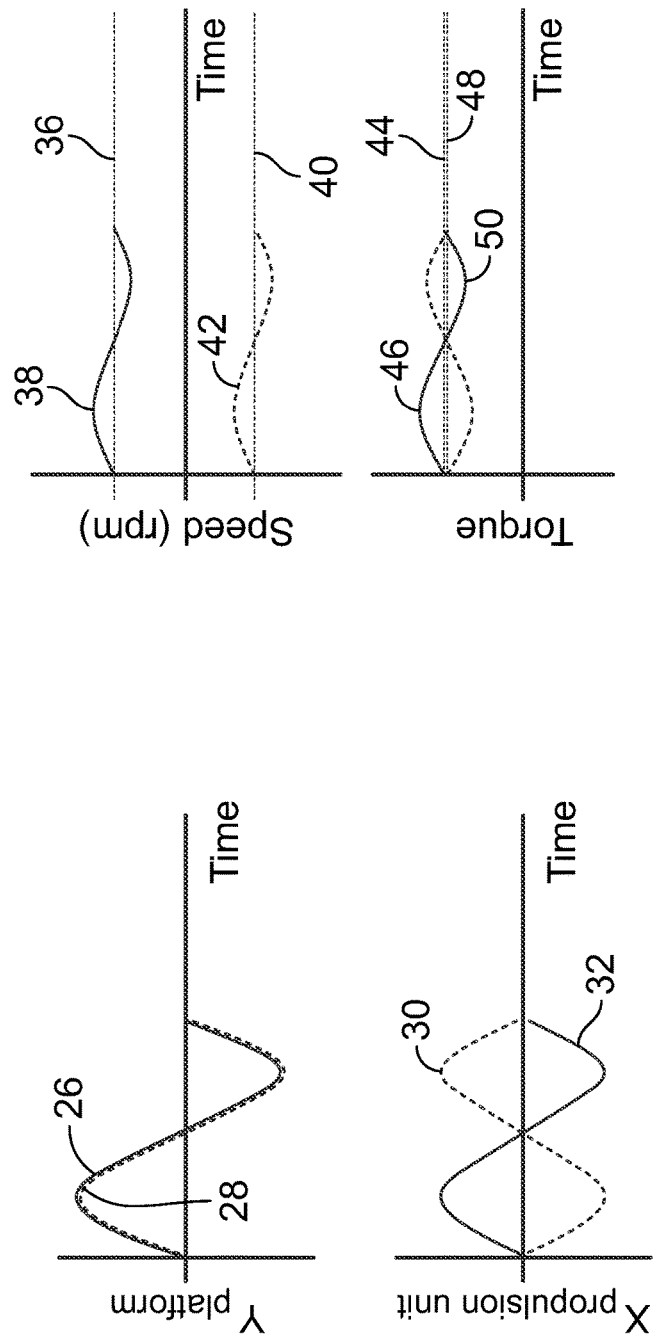
FIG. 3 schematically depicts corresponding traction motor speed and torque oscillations of traction motors of the propulsion units of the vehicle system of FIG. 1 according to the first mode.

Referring to FIG. 3, the oscillatory movements of the axles of the front and rear propulsion units caused by the vertical and/or longitudinal movements of the platform in the first transient mode cause variations in the speed (rpm) and the torque provided by the propulsion units. The variations in the speed and the torque cause a speed sensor signal 38 to oscillate with respect to an average speed 36 of a motor of the front propulsion unit and cause a speed sensor signal 42 to oscillate with respect to an average speed 40 of a motor of the rear propulsion unit. The oscillatory movements of the axles of the front and rear propulsion units also cause the torque 46 of the motor of the front propulsion unit to oscillate with respect to an average torque 44 of the motor of the front propulsion unit and cause the torque 50 of the motor of the rear propulsion unit to oscillate with respect to an average torque 48 of the motor of the rear propulsion unit. The torque variations of the motors may further amplify the oscillations of the axles of the propulsion units and/or cause sustained oscillations of the axles.

Referring to FIG. 4, if the speed 78 of the front propulsion unit and the speed 80 of the rear propulsion unit are less than the vehicle speed (as indicated by the arrows) a moment 82 is created on the front of the vehicle and a moment 84 is created on the back of the vehicle. The moments cause the front and rear of the vehicle to move in opposite directions, for example in a manner similar to a seesaw. It should be appreciated that the relative speed of the front propulsion unit to the vehicle speed may be the same as the relative speed of the rear propulsion unit to the vehicle speed, or different. It should also be appreciated that the front moment may be the same as or different from the rear moment.

In a nominal phase mode, the front and the rear of the vehicle platform are displaced vertically in an oscillating manner at the same rate and with the same phase. In an out of phase mode, the front and rear of the vehicle platform are displaced vertically in an oscillating manner where the oscillation of the front of the vehicle platform is in a different phase than the oscillation of the rear of the platform. In an in-phase mode, the front and rear of the vehicle platform are displaced vertically in an oscillating manner where the oscillation of the front of the vehicle platform is in the same phase as the oscillation of the rear of the platform but in different directions at the same time. The front of the platform may experience a displacement 88 that is out of phase with a displacement 86 of the rear of the platform.

Referring to FIG. 5, a vehicle platform may experience transient modes when the speed of the front propulsion unit and the speed of the rear propulsion unit are less relative to the vehicle speed. The front propulsion unit may have a displacement 90 that is in phase with a displacement 92 of the rear propulsion unit. Although the front propulsion unit displacement and the rear propulsion unit displacement are shown as having equal amplitude, it should be appreciated that the displacements may have different magnitudes.

Referring to FIG. 6, the oscillatory movements of the axles of the front and rear propulsion units caused by the vertical and/or longitudinal movements of the platform in the second transient mode causes a speed sensor signal 94 to oscillate with respect to an average speed 96 of a motor of the front propulsion unit and a speed sensor signal 98 to oscillate with respect to an average speed 100 of a motor of the rear propulsion unit The oscillatory movements of the axles of the front and rear propulsion units also cause the torque 102 of the motor of the front propulsion unit to oscillate with respect to an average torque 104 of the motor of the front propulsion unit and the torque 106 of the motor of the rear propulsion unit to oscillate with respect to an average torque 108 of the motor of the rear propulsion unit. The torque variations may further amplify the oscillations and/or cause sustained oscillations.

Figure 7:
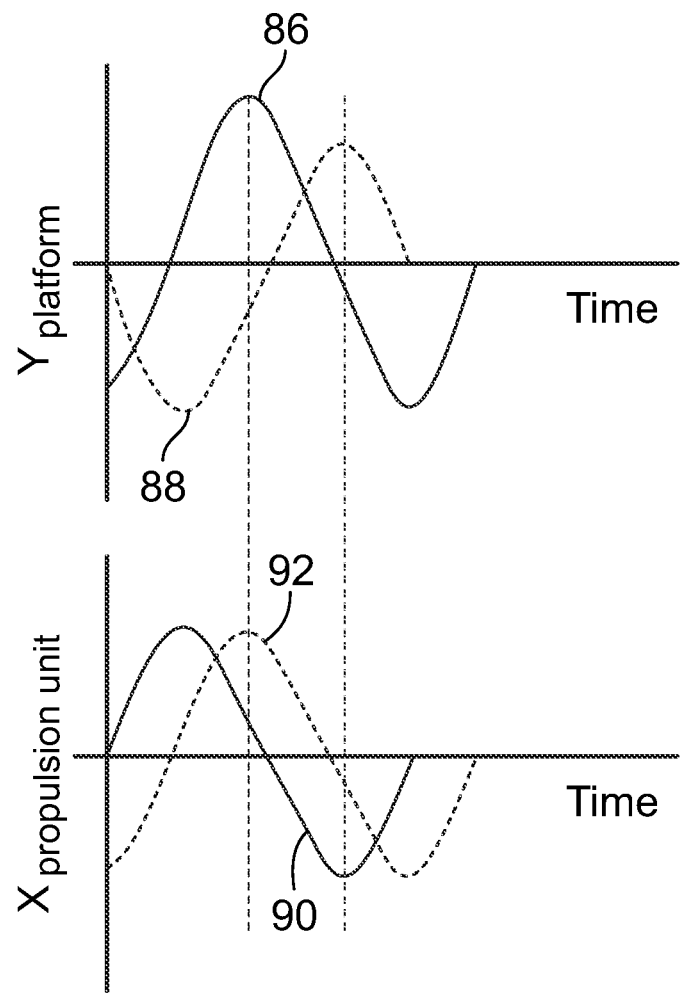
FIG. 7 schematically depicts multiple modes of movements of a vehicle system according to one embodiment.

Referring to FIG. 7, the vehicle may experience multiple transient modes of the platform and the front and rear propulsion units. The rear of the platform may have a displacement that is out of phase with the displacement of the front of the platform. The rear propulsion unit may have a displacement that is out of phase with a displacement of the front propulsion unit. As discussed in more detail below, the transient modes of the front and rear of the platform and the front and rear propulsion units may be reduced Referring to FIG. 8, a system 52 configured to actively dampen transient modes of the platform and the propulsion units includes a subtractor 54 that determines a speed difference between a first speed 56 from a first axle of a first propulsion unit of the vehicle and a second speed 58 from a second axle of a second propulsion unit. The first and second propulsion units are different propulsion units of the vehicle. The terms "first" and "second" are merely designations and do not imply any order of the inputs, axles, or propulsion units. The subtractor determines a speed difference 60 between the first speed and the second speed. A band pass filter 62 allows signals of the speed difference close to the expected resonance frequency of the platform to pass to a clamp 66 configured to prevent the passed speed signal 64 from exceeding a reference value. The passed speed signal is amplified by an amplifier 68 to a compensating torque 70. A torque command 72 is input to an adder 74 with the compensating torque 70 and a modified torque command 76 is applied to a traction motor of the front propulsion unit to dampen the transient mode of the platform. The modified torque command has a magnitude and a phase shift that provides damping to the platform.

It should be appreciated that the speed difference signal may be determined from other inputs. For example, the speed difference signal may be determined as a difference between a speed of one axle of one propulsion unit and a speed of the vehicle. As another example, the speed difference signal may be determined as the difference between an average speed of the front propulsion unit and an average speed of the rear propulsion unit. As yet another example, the speed difference signal may be determined as the difference between an average speed of a propulsion unit and the vehicle speed.

It should also be appreciated that other filters may be used in addition to and/or alternatively to the band pass filter. For example, the speed difference signal may first be passed through a lead filter 63 prior to the band pass filter as shown in FIG. 9 which schematically depicts a system 53 for actively damping transient modes of the vehicles of FIGS. 1 and 4 according to one embodiment. As another example, the speed difference signal may be passed through a single filter, multiple cascaded filters, multiple parallel filters, or any combination thereof.

It should be further appreciated that the modified torque command may be applied to a propulsion unit other than the front propulsion unit. The modified torque command may be applied to any motor(s) of any propulsion unit or combination of traction motors and/or propulsion units to actively damp the transient modes of the platform. The modified torque command may also be applied at the propulsion unit level on the total operator command for the propulsion unit.

A system as shown and disclosed in FIG. 8 or 9 may each be provided as a circuit of a controller or processor or a computer. The system may be provided on the vehicle or may be provided on another vehicle connected to vehicle as part of a vehicle system.

Figure 10:
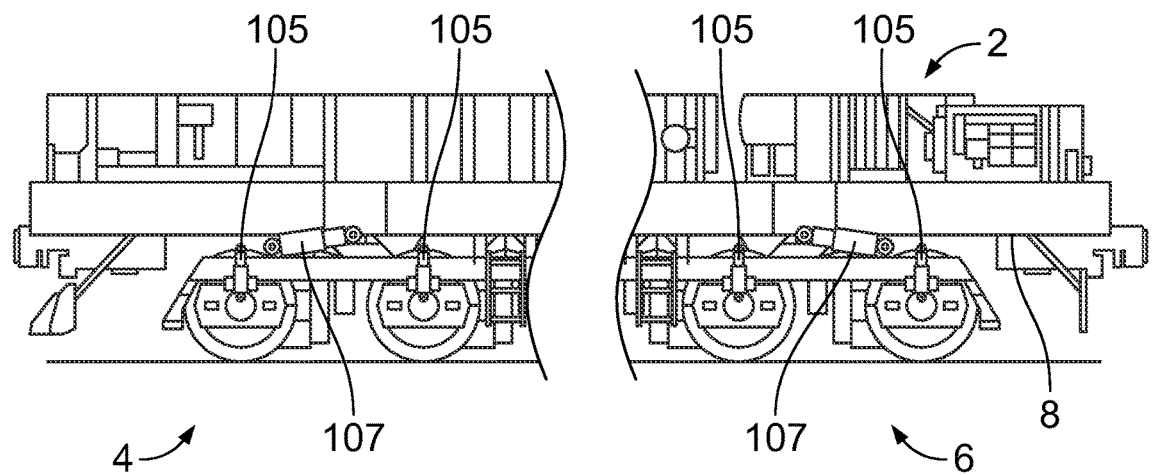
FIG. 10 schematically depicts a vehicle system including vertical and lateral dampers between a platform and propulsion units of the vehicle system according to one embodiment.

Referring to FIG. 10, a vehicle according to one embodiment may include vertical dampers 105 between the platform and the propulsion units. The vehicle may also include lateral dampers 107 between the platform and the propulsion units. The vertical and lateral dampers may be provided on both sides of the vehicle and the number of dampers may vary depending on damping requirements. The vertical and lateral dampers are used to damp the relative motion, vertical and lateral, between the platform and the propulsion units. The vertical and lateral dampers may be used with or without the active damping system described herein. If one or more of the vertical and/or lateral dampers degrades or fails the quality of the ride of the vehicle may degrade.

Figure 11:
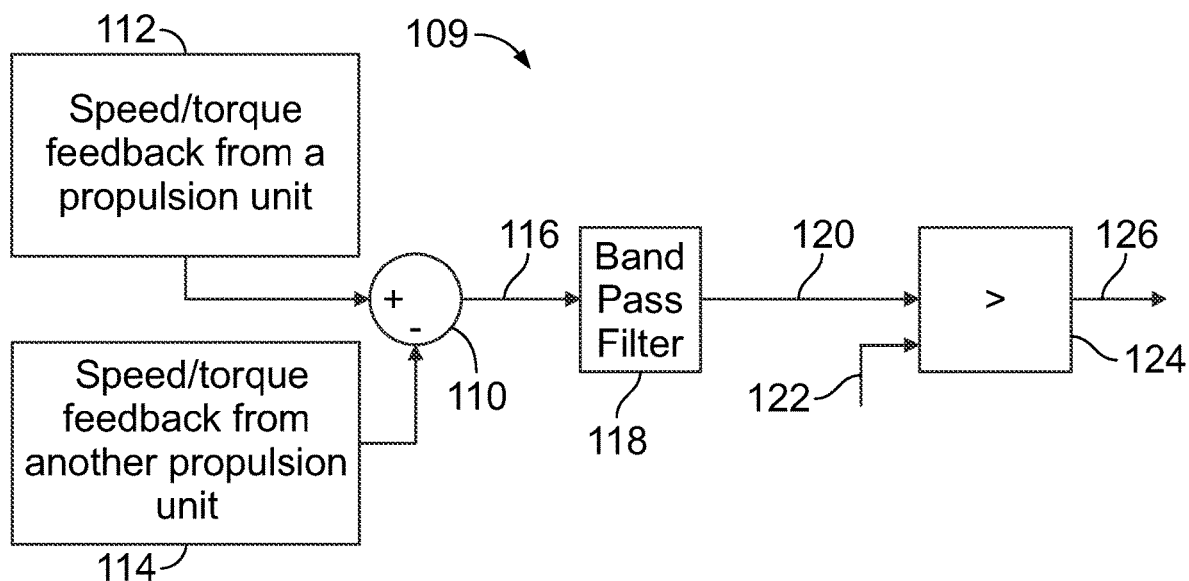
FIG. 11 schematically depicts a system to detect degradation of suspension systems of a vehicle system according to one embodiment.

Referring to FIG. 11, a system 109 to detect damper degradation according to one embodiment may be used in a vehicle in which only mechanical damping is used. The system may include a subtractor 110 that determines a speed or torque difference between a first speed or torque 112 from a first axle of a first propulsion unit of the vehicle and a second speed or torque 114 from a second axle of a second propulsion unit. The first and second propulsion units are different propulsion units of the vehicle. The terms "first" and "second" are merely designations and do not imply any order of the inputs, axles, or propulsion units. The subtractor determines a speed or torque difference 116 between the first speed or torque and the second speed or torque. A band pass filter 118 allows signals 120 of the speed or torque difference having a frequency close to the expected resonance frequency of the platform to pass to a comparator 124. According to one embodiment, signals of the speed or torque difference having a frequency within +/−10% to the expected resonance frequency of the platform are passed by the comparator. The comparator compares the speed or torque difference passed by the band pass filter to a speed or torque difference threshold value 122. The comparator outputs an observed speed or torque difference value 126 that is the greater of the speed or torque difference passed by the band pass filter and the speed or torque difference threshold. If the comparator determines that the speed or torque difference passed by the band pass filter is greater than the threshold speed or torque difference then damper degradation can be confirmed. Depending on the motor position for which the higher magnitude is detected, the degraded damper can be identified. The frequency of the speed or torque feedback difference may also be used to detect damper degradation.

Figure 12:
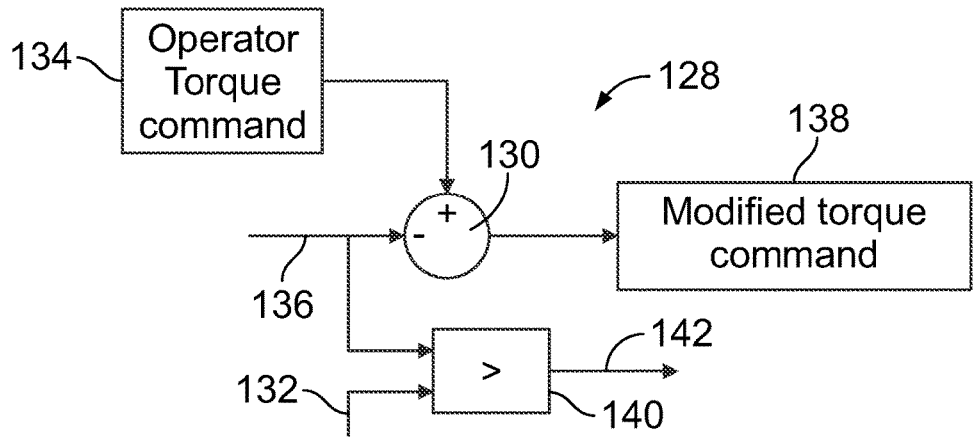
FIG. 12 schematically depicts a system to detect degradation of suspension systems of a vehicle system according to one embodiment.

Referring to FIG. 12, a system 128 to detect damper degradation according to one embodiment may be used in a vehicle in which mechanical damping and active damping are used. The system may include a subtractor 130 that determines a difference between an operator torque command 134 and a compensating (i.e. damping) torque 136. The difference between the operator torque command and the compensating torque provides a modified torque command 138, for example to a motor of the front propulsion unit. The modified torque command may be applied to other motors of other propulsion units in a manner similar to that described with respect to FIG. 8.

The compensating torque may also be compared to a threshold torque 132 by a comparator 140. The comparator outputs an observed torque difference value 142 that is the greater of the compensating torque and the threshold torque. If the comparator 140 determines that the compensating torque is greater than the torque threshold then damper degradation can be confirmed. Depending on the tractor motor position for which the higher magnitude is detected, the degraded damper can be identified.

Figure 13:
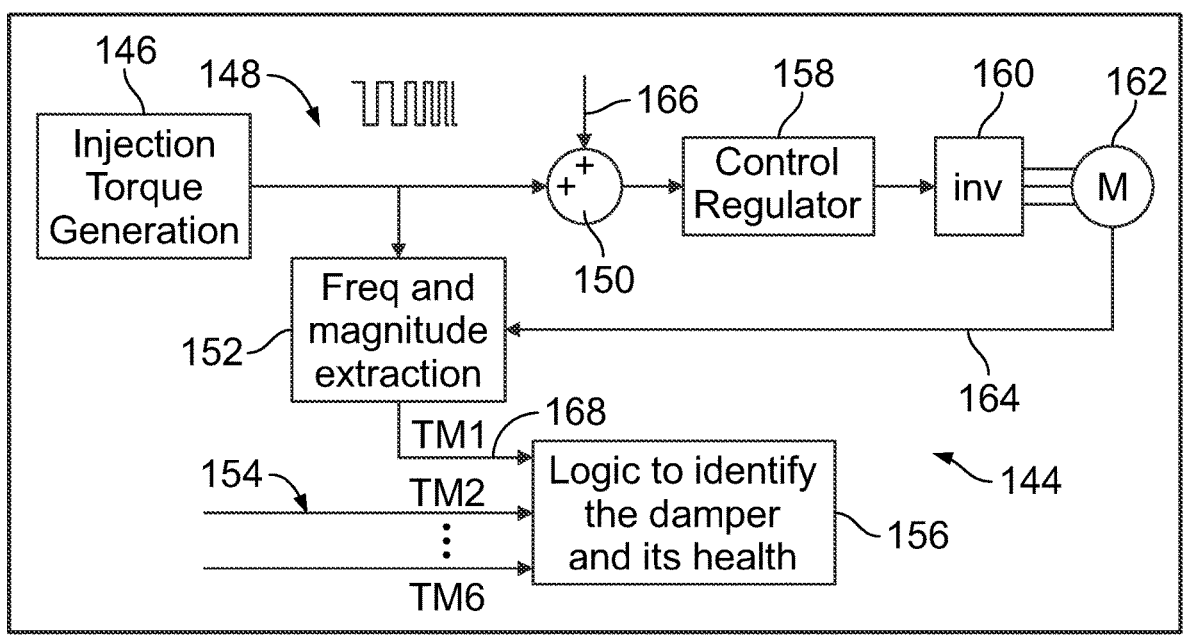
FIG. 13 schematically depicts a system to detect degradation of suspension systems of a vehicle system according to one embodiment.

Referring to FIG. 13, a system 144 to detect damper degradation according to one embodiment may be used in a vehicle in which mechanical damping is used. The system may also be used in a vehicle in which mechanical damping and active damping are used. An injection torque generator 146, which may be one or more motors of the vehicle propulsion units, provides an injection torque 148 to excite a damper with a known frequency and magnitude over a reference torque value 166. The injection torque may be within a range of frequency and magnitude, an impulse or chirp signal, or a train of pulses with different frequencies and magnitude ranges. The known frequency and magnitude torque pulses may be generated from one or more axles of the propulsion units simultaneously.

An adder 150 adds the injection torque and the reference torque value and a regulator 158 applies the sum to an inverter 160 which applies the added torque values to a motor 162 of one or more propulsion units. A speed feedback signal 164 is sent to an extractor 152 that extracts a frequency and magnitude of the speed feedback signal. If the extracted magnitude and frequency values 168 match determined values and/or threshold values 154 from other motors as determined by a controller or processor or a computer 156 then the health of the damper and its location can be determined. The controller or processor or a computer can determine the health and location of the dampers on a per axle basis or by a supervisory control for multiple axes.

Figure 14:
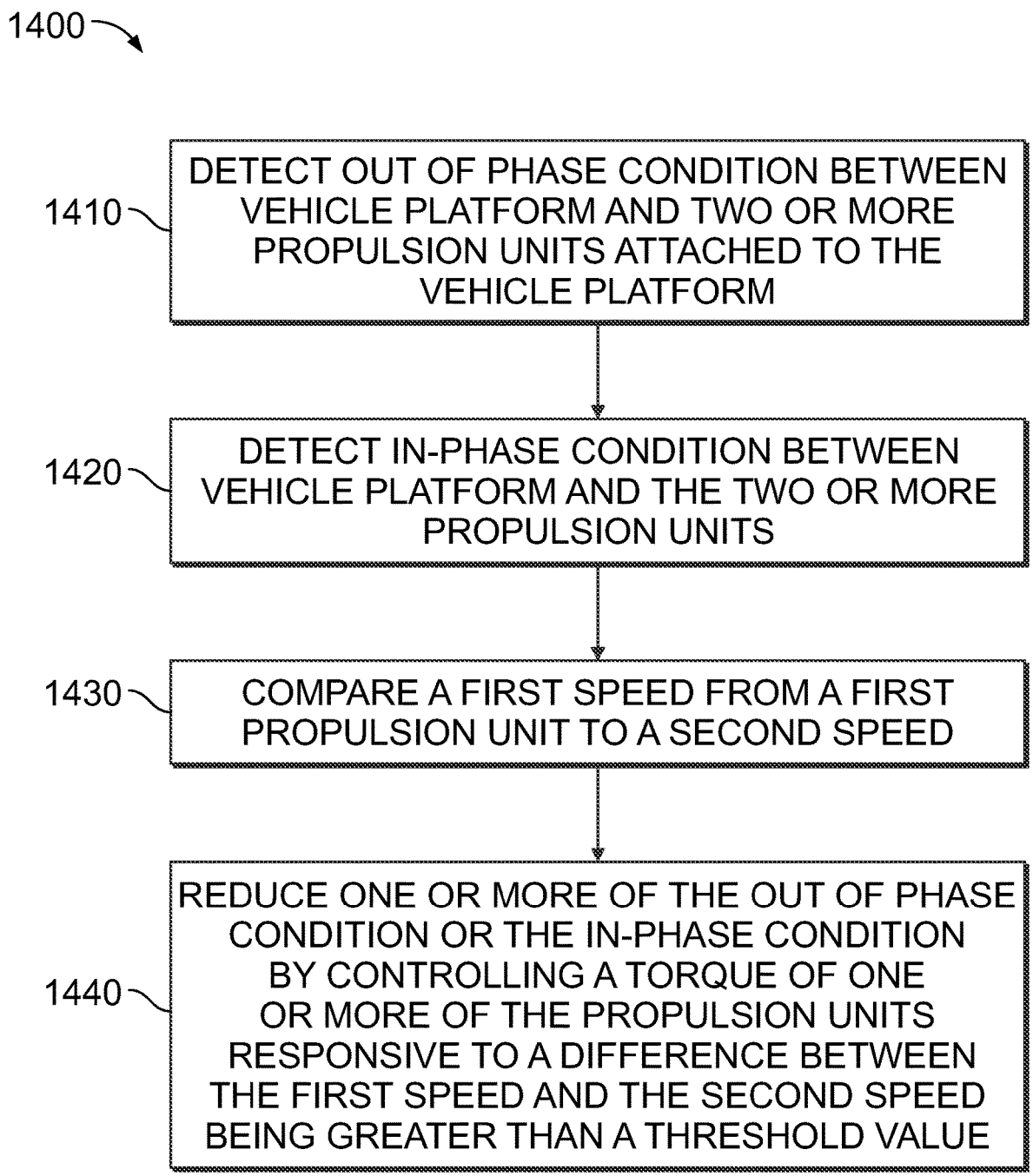
FIG. 14 schematically depicts a method according to one embodiment.

Referring to FIG. 14, a method 1400 according to one embodiment comprises detecting an out of phase condition between a vehicle platform of a vehicle and two or more propulsion units attached to the vehicle platform 1410. The method also comprises detecting an in-phase condition between a vehicle platform of a vehicle and the two or more propulsion units attached to the vehicle platform 1420 and comparing a first speed from a first propulsion unit of the two or more propulsion units to a second speed 1430. The method further comprises controlling a torque of one or more motors of the two or more propulsion units to reduce one or more of the out of phase condition or the in-phase condition when a difference between the first speed and the second speed is greater than a threshold value 1440.

Figure 15:
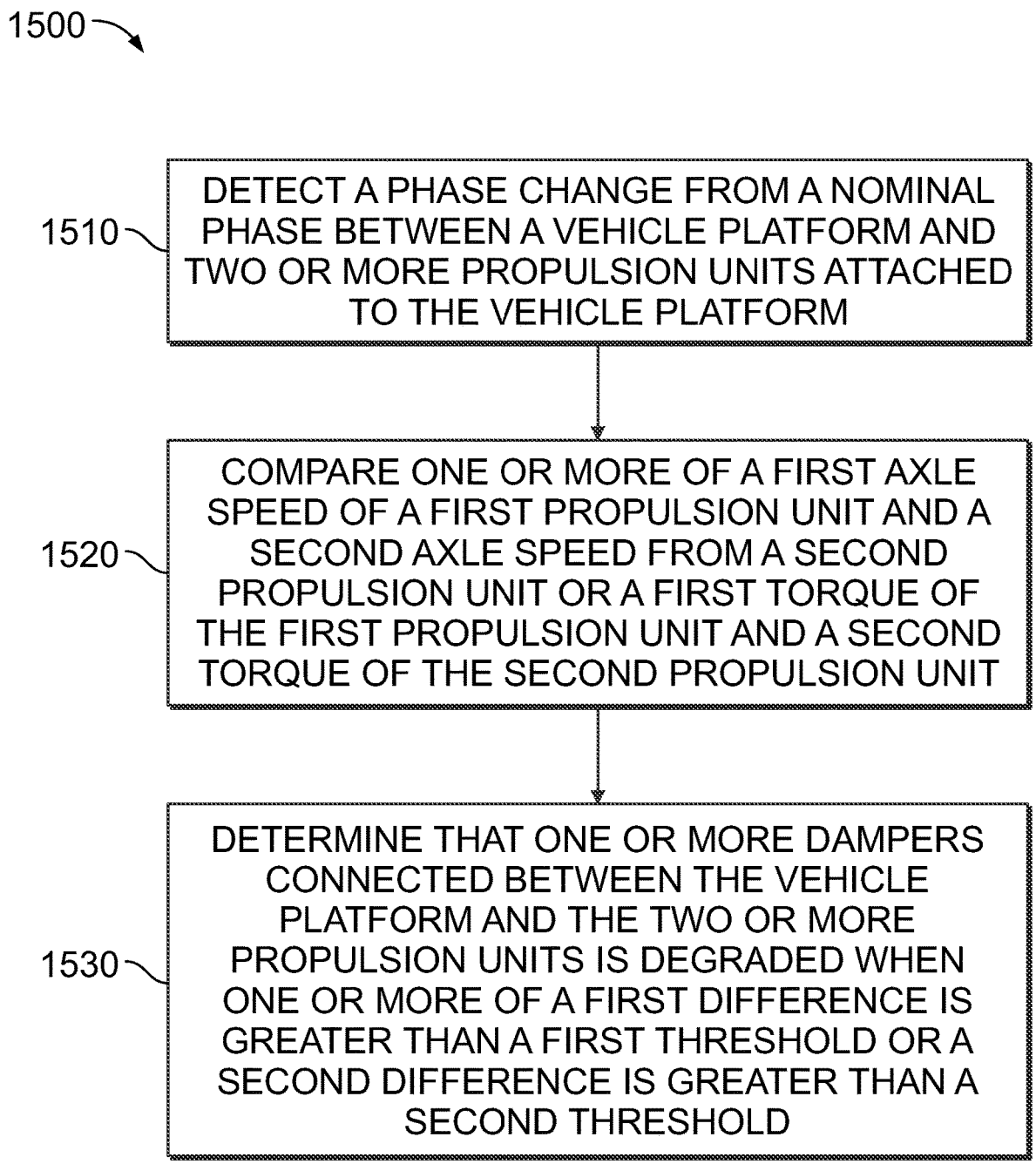
FIG. 15 schematically depicts a method according to one embodiment.

Referring to FIG. 15, a method 1500 comprises detecting a phase change from a nominal phase between a vehicle platform of a vehicle and two or more propulsion units attached to the vehicle platform 1510 and comparing one or more of a first axle speed from a first axle of a first propulsion unit and a second axle speed from a second axle of a second propulsion unit or a first torque of a first motor of the first propulsion unit and a second torque of a second motor of the second propulsion unit 1520. The method further comprises determining that one or more dampers connected between the vehicle platform and the two or more propulsion units is degraded when one or more of a first difference between the first axle speed and the second axle speed is greater than a first threshold difference or a second difference between the first torque and the second torque is greater than a second threshold difference 1530.

A method may include detecting an out of phase condition between a vehicle platform of a vehicle propulsion units attached to the vehicle platform and detecting an in-phase condition between the vehicle platform of a vehicle and the two or more propulsion units attached to the vehicle platform. The method may further include comparing a first speed from a first propulsion unit of the propulsion units to a second speed and reducing one or more of the out of phase condition or the in-phase condition by controlling a torque of one or more of the propulsion units responsive to a difference between the first speed and the second speed being greater than a threshold value.

Optionally, the first speed from the first propulsion unit is a first axle speed of the first prolusion unit or an average speed of the first propulsion unit and the second speed is a second axle speed of a second propulsion unit or an average speed of the second propulsion unit or a speed of the vehicle.

Optionally, the first speed and the second speed are compared at a resonance frequency of the platform and the attached two or more propulsion units and the method may further include filtering out comparisons of the first speed and the second speed that are not within a range of the resonance frequency.

Optionally, a first propulsion unit may be in a front of the vehicle and a second propulsion unit may be in a rear of the vehicle. Detecting the out of phase condition may include detecting a first motor speed oscillation feedback of the first propulsion unit about an average first motor speed feedback, about a vehicle speed, or about an average speed of the first propulsion unit and detecting a second motor speed oscillation feedback of a second motor of a second propulsion unit about an average second motor speed feedback or about the vehicle speed or about an average speed of the second propulsion unit.

Optionally, a first propulsion unit is in a front of the vehicle and a second propulsion unit is in a rear of the vehicle. Detecting the in-phase condition may include detecting a first motor speed oscillation feedback of the first propulsion unit about an average first motor speed feedback, about a vehicle speed, or about an average speed of the first propulsion unit. Detecting a second motor speed oscillation feedback of a second motor of a second propulsion unit about an average second motor speed feedback or about the vehicle speed or about an average speed of the second propulsion unit.

A method may include detecting a phase change from a nominal phase between a vehicle platform of a vehicle and two or more propulsion units attached to the vehicle platform and comparing one or more of a first axle speed from a first axle of a first propulsion unit and a second axle speed from a second axle of a second propulsion unit or a first torque of a first motor of the first propulsion unit and a second torque of a second motor of the second propulsion unit. The method may further include determining that one or more dampers connected between the vehicle platform and the two or more propulsion units is degraded when one or more of a first difference between the first axle speed and the second axle speed is greater than a first threshold difference or a second difference between the first torque and the second torque is greater than a second threshold difference.

Optionally, one or more of the first axle speed of the first propulsion unit and the second axle speed from the second propulsion unit are compared at a resonance frequency of the platform and the attached two or more propulsion units or the first torque of the first motor of the first propulsion unit and the second torque of the second motor of the second propulsion unit are compared at the resonance frequency of the platform and the attached two or more propulsion units.

Optionally, the method may further include filtering out comparisons of the first axle speed and the second axle speed not within a range of the resonance frequency and/or filtering out comparisons of the first torque and the second torque not within a range of the resonance frequency.

Optionally, the method may further include applying a damping torque by one or more motors to one or more axles of the two or more propulsion units to reduce one or more of the out of phase condition or the in-phase condition.

Optionally, the method may further include determining that one of more of the dampers is degraded if the damping torque exceeds a threshold damping torque.

Optionally, detecting the phase change includes detecting a first motor speed oscillation feedback of the first propulsion unit about an average first motor speed feedback and detecting a second motor speed oscillation feedback of a second motor of a second propulsion unit about an average second motor speed feedback. The first propulsion unit may be in a front of the vehicle and the second propulsion unit may be in a rear of the vehicle.

A vehicle system may include a platform, two or more propulsion units attached to the platform, and a processor. The processor may compare a first speed from a first propulsion unit of the two or more propulsion units to a second speed and detect from the comparison of the first speed and the second speed an out of phase condition between the platform and the two or more propulsion units attached to the vehicle platform. The processor may further detect from the comparison of the first speed and the second speed an in-phase condition between the platform and the two or more propulsion units attached to the vehicle platform.

Optionally, the processor may further control a torque of one or more motors of the two more propulsion units to reduce one or more of the out of phase condition or the in-phase condition when a difference between the first speed and the second speed is greater than a threshold difference.

Optionally, the first speed from the first propulsion unit is a first axle speed of the first prolusion unit or an average speed of the first propulsion unit and the second speed is a second axle speed of a second propulsion unit or an average speed of the second propulsion unit or a speed of the vehicle.

Optionally, the first speed and the second speed are compared at a resonance frequency of the platform and the attached two or more propulsion units and the processor may further filter out comparisons of the first axle speed and the second axle speed not within a range of the resonance frequency.

Optionally, detecting one or more of the out of phase condition or the in-phase condition includes detecting a first motor speed oscillation feedback of the first propulsion unit about an average first motor speed feedback and detecting a second motor speed oscillation feedback of a second motor of a second propulsion unit about an average second motor speed feedback. The first propulsion unit may be in a front of the vehicle and the second propulsion unit may be in a rear of the vehicle.

Optionally, the processor may further compare one or more of a first axle speed from a first axle of the first propulsion unit and a second axle speed from a second axle of the second propulsion unit or a first torque of a first motor of the first propulsion unit and a second torque of a second motor of the second propulsion unit. The processor may further determine that one or more dampers connected between the vehicle platform and the two or more propulsion units is degraded when one or more of a first difference between the first axle speed and the second axle speed is greater than a first threshold difference or a second difference between the first torque and the second torque is greater a second threshold difference.

Optionally, one or more of the first axle speed of the first propulsion unit and the second axle speed of the second propulsion unit are compared at a resonance frequency of the platform and the attached two more propulsion units or the first torque of the first motor of the first propulsion unit and the second torque of the second motor of the second propulsion unit are compared at the resonance frequency of the platform and the attached two or more propulsion units. The processor may further one or more of filter out comparisons of the first axle speed and the second axle speed not within a range of the resonance frequency or filter out comparisons of the first torque and the second torque not within a range of the resonance frequency.

Optionally, the processor may further apply a damping torque by one or more motors to one or more axles of the two more propulsion units to reduce one or more of the out of phase condition or the in-phase condition.

Optionally, the processor may further determine that one of more of the dampers is degraded if the damping torque exceeds a threshold damping torque.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method, comprising:
    detecting an out of phase condition between a vehicle platform of a vehicle and propulsion units attached to the vehicle platform;
    detecting an in-phase condition between the vehicle platform and the propulsion units attached to the vehicle platform;
    comparing a first speed from a first propulsion unit of the propulsion units to a second speed; and
    reducing one or more of the out of phase condition or the in-phase condition by controlling a torque of one or more of the propulsion units responsive to a difference between the first speed and the second speed being greater than a threshold value.

2. The method of claim 1, wherein the first speed and the second speed are compared at a resonance frequency of the platform and the attached propulsion units and the method further comprises:
    filtering out comparisons of the first speed and the second speed that are not within a range of the resonance frequency.

3. The method of claim 1, wherein the first speed from the first propulsion unit is a first axle speed of the first prolusion unit or an average speed of the first propulsion unit and the second speed is a second axle speed of a second propulsion unit, an average speed of the second propulsion unit, or a moving speed of the vehicle.

4. The method of claim 3, wherein the first propulsion unit is in a front of the vehicle and a second propulsion unit is in a rear of the vehicle, and detecting the out of phase condition comprises detecting a first motor speed oscillation feedback of the first propulsion unit about an average first motor speed feedback, about a moving speed of the vehicle, or about an average speed of the first propulsion unit and detecting a second motor speed oscillation feedback of a second motor of a second propulsion unit about an average second motor speed feedback, about the moving speed of the vehicle, or about an average speed of the second propulsion unit.

5. The method of claim 3, wherein the first propulsion unit is in a front of the vehicle and a second propulsion unit is in a rear of the vehicle, and detecting the in-phase condition comprises detecting a first motor speed oscillation feedback of the first propulsion unit about an average first motor speed feedback or about a moving speed of the vehicle or about an average speed of the first propulsion unit, and detecting a second motor speed oscillation feedback of a second motor of a second propulsion unit about an average second motor speed feedback, about the moving speed of the vehicle, or about an average speed of the second propulsion unit.

6. A method, comprising:
  detecting a phase change from a nominal phase between a vehicle platform of a vehicle and two or more propulsion units attached to the vehicle platform;
  comparing one or more of a first axle speed from a first axle of a first propulsion unit and a second axle speed from a second axle of a second propulsion unit or a first torque of a first motor of the first propulsion unit and a second torque of a second motor of the second propulsion unit; and
  determining that one or more dampers connected between the vehicle platform and the two or more propulsion units is degraded when one or more of a first difference between the first axle speed and the second axle speed is greater than a first threshold difference or a second difference between the first torque and the second torque is greater than a second threshold difference.

7. The method of claim 6, wherein one or more of the first axle speed of the first propulsion unit and the second axle speed from the second propulsion unit are compared at a resonance frequency of the platform and the attached two or more propulsion units or the first torque of the first motor of the first propulsion unit and the second torque of the second motor of the second propulsion unit are compared at the resonance frequency of the platform and the attached two or more propulsion units.

8. The method of claim 7, further comprising:
  filtering out comparisons of the first axle speed and the second axle speed not within a range of the resonance frequency and/or filtering out comparisons of the first torque and the second torque not within a range of the resonance frequency.

9. The method of claim 6, further comprising:
  applying a damping torque by one or more motors to one or more axles of the two or more propulsion units to reduce one or more of an out of phase condition or an in-phase condition.

10. The method of claim 9, further comprising:
  determining that one of more of the dampers is degraded if the damping torque exceeds a threshold damping torque.

11. The method of claim 6, wherein detecting the phase change comprises detecting a first motor speed oscillation feedback of the first propulsion unit about an average first motor speed feedback and detecting a second motor speed oscillation feedback of a second motor of a second propulsion unit about an average second motor speed feedback, and the first propulsion unit is in a front of the vehicle and the second propulsion unit is in a rear of the vehicle.

12. A vehicle system, comprising:
  a platform;
  two or more propulsion units attached to the platform; and
  a processor configured to:
    compare a first speed from a first propulsion unit of the two or more propulsion units to a second speed;
    detect from the comparison of the first speed and the second speed an out of phase condition between the platform and the two or more propulsion units attached to the platform; and
    detect from the comparison of the first speed and the second speed an in-phase condition between the platform and the two or more propulsion units attached to the platform.

13. The vehicle system of claim 12, wherein the processor is further configured to:
  control a torque of one or more motors of the two or more propulsion units to reduce one or more of the out of phase condition or the in-phase condition when a difference between the first speed and the second speed is greater than a threshold difference.

14. The vehicle system of claim 12, wherein the first speed from the first propulsion unit is a first axle speed of the first prolusion unit or an average speed of the first propulsion unit and the second speed is a second axle speed of a second propulsion unit or an average speed of the second propulsion unit or a speed of the vehicle.

15. The vehicle system of claim 12, wherein the first speed and the second speed are compared at a resonance frequency of the platform and the attached two or more propulsion units and the processor is further configured to filter out comparisons of the first axle speed and the second axle speed not within a range of the resonance frequency.

16. The vehicle system of claim 12, wherein detecting one or more of the out of phase condition or the in-phase condition comprises detecting a first motor speed oscillation feedback of the first propulsion unit about an average first motor speed feedback and detecting a second motor speed oscillation feedback of a second motor of a second propulsion unit about an average second motor speed feedback, and the first propulsion unit is in a front of the vehicle and the second propulsion unit is in a rear of the vehicle.

17. The vehicle system of claim 12, wherein the processor is further configured to:
  compare one or more of a first axle speed from a first axle of the first propulsion unit and a second axle speed from a second axle of the second propulsion unit or a first torque of a first motor of the first propulsion unit and a second torque of a second motor of the second propulsion unit; and
  determine that one or more dampers connected between the platform and the two or more propulsion units is degraded when one or more of a first difference between the first axle speed and the second axle speed is greater than a first threshold difference or a second difference between the first torque and the second torque is greater than a second threshold difference.

18. The vehicle system of claim 17, wherein one or more of the first axle speed of the first propulsion unit and the second axle speed of the second propulsion unit are compared at a resonance frequency of the platform and the attached two more propulsion units or the first torque of the first motor of the first propulsion unit and the second torque of the second motor of the second propulsion unit are compared at the resonance frequency of the platform and the attached two or more propulsion units and the processor is further configured to one or more of filter out comparisons of the first axle speed and the second axle speed not within a range of the resonance frequency or filter out comparisons of the first torque and the second torque not within a range of the resonance frequency.

19. The vehicle system of claim 18, wherein the processor is further configured to:
   apply a damping torque by one or more motors to one or more axles of the two more propulsion units to reduce one or more of the out of phase condition or the in-phase condition.

20. The vehicle system of claim 19, wherein the processor is further configured to:
   determine that one of more of the dampers is degraded if the damping torque exceeds a threshold damping torque.

* * * * *